United States Patent Office 3,644,624
Patented Feb. 22, 1972

3,644,624
METHOD OF CONTROLLING HELMINTHIASIS
Lloyd H. Conover, Quaker Hill, and James W. McFarland, Lyme, Conn., and William C. Austin, Deal, England, assignors to Pfizer Inc., New York, N.Y.
No Drawing. Division of application Ser. No. 661,220, Aug. 17, 1967, now Patent No. 3,549,624, which is a continuation-in-part of application Ser. No. 515,736, Dec. 22, 1965, which is a continuation-in-part of application Ser. No. 487,654, Sept. 16, 1965, which in turn is a continuation-in-part of application Ser. No. 428,859, Jan. 28, 1965. This application Nov. 5, 1969, Ser. No. 870,750
Int. Cl. A61k 27/00
U.S. Cl. 424—251
7 Claims

ABSTRACT OF THE DISCLOSURE

The preparation of a series of cyclic amidines; namely, 2 - [ω-(2-thienyl)alkyl]-, 2-[2-(2-thienyl)vinyl]-$\Delta^2$-tetrahydropyrimidines and $\Delta^2$ - imidazolines, the N - methyl derivatives and non-toxic acid addition salts thereof, and their use as anthelmintic agents, is described.

CROSS-REFERENCE TO RELATED APPLICATIONS

This application is a division of application Ser. No. 661,220 filed Aug. 17, 1967 now U.S. Pat. 3,549,624, which in turn is a continuation-in-part of now abandoned application Ser. No. 515,736, filed Dec. 22, 1965, which in turn is a continuation-in-part of now abandoned Ser. No. 487,654, filed Sept. 16, 1965, which in turn is a continuation-in-part of now abandoned Ser. No. 428,859, filed Jan. 28, 1965.

BACKGROUND OF THE INVENTION

This invention relates to a series of novel cyclic amidines and their non-toxic acid addition salts which are especially useful as anthelmintic agents. More particularly, it relates to 2-[ω-(2-thienyl)alkyl-]-, 2-[2-(2-thienyl)vinyl]-$\Delta^2$-tetrahydropyrimidines and $\Delta^2$-imidazolines, the N-lower alkyl derivatives and the non-toxic acid addition salts thereof as agents for the control of helminthiasis in animals.

Helminthiasis, the infestation of the animal body by various species of parasitic worms, is perhaps the most common, most serious and most widespread disease in the world today. Although the economic significance of this disease has led to extensive research for new and more effective anthelmintics the countermeasures developed to date have not been entirely satisfactory for one or more reasons; e.g., poor therapeutic index, specificity of action, high cost, low activity, limited anthelmintic spectrum.

SUMMARY OF THE INVENTION

According to the present invention it has now been unexpectedly found that 2-[ω-(2-thienyl)alkyl]-, 2-[2-(2-thienyl)vinyl]-$\Delta^2$-tetrahydropyrimidines and $\Delta^2$-imidazolines, their N- lower alkyl derivatives having the general formulae:

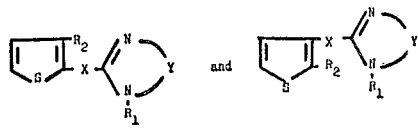

and the non-toxic acid addition salts thereof wherein $R_1$ is selected from the group consisting of hydrogen and methyl; $R_2$ is selected from the group consisting of hydrogen, methyl, ethyl, chloro, bromo, iodo and fluoro; Y is lower alkylene and is selected from the group consisting of ethylene (—$CH_2$—$CH_2$—) and trimethylene (—$CH_2$—$CH_2$—$CH_2$—)

and X is selected from the group consisting of ethylene, trimethylene and vinylene (cis and trans isomers), with the proviso that when X is trimethylene, $R_2$ is selected from the group consisting of hydrogen and methyl, are surprisingly effective agents in the control, e.g. therapeutic and prophylactic, of helminthiasis in animals, including man, when administered orally or parenterally.

The non-toxic acid addition salts of the above mentioned bases which may be employed are the water soluble and water insoluble salts such as the hydrochloride, hydrobromide, phosphate, nitrate, sulfate, acetate, citrate, gluconate, benzoate, propionate, butyrate, sulphosalicylate, maleate, laurate, malate, fumarate, succinate, oxalate, tartrate, amsonate (4,4'-diaminostilbene-2,2'-disulfonate), pamoate (1,1' - methylene - bis-2-hydroxy-3-naphthoate), stearate, 2 - hydroxy - 3-naphthoate, hexafluorophosphate, toluene-p-sulfonate, suramin salt, methiodide, methobromide, methochloride and resin adsorbates.

These agents are active against schistosomes and against both the mature and the immature forms of helminths, especially certain species of nematodes, particularly those of the suborders Strongylata, Ascaridata and Trichurata. The following genera are mentioned in particular: Haemonchus, Trichostrongylus, Ascaris, Trichuris, Ancylostoma, Nematodirus, Strongylus, Cooperia and Bunostomum. They are especially effective against the gastrointestinal parasites of ruminants (e.g. sheep, cattle, goats) and of non-ruminants such as dogs, cats, horses and swine.

Methods of studying the sensitivity of this group of parasites to chemotherapeutic agents comprise selecting a laboratory-induced parasitic infestation of a laboratory animal exhibiting a similar host-parasite relationship to that found between such parasites and domestic animals. Such a relationship exists between *Nematospiroides dubius* and laboratory mice, between *Nippostrongylus muris* and laboratory rats and mice, and between *Syphacia obvelata* and laboratory rats and mice. The test with *N. dubius* in laboratory mice is carried out by collecting the fecal matter of an infected mouse and suspending it in moist charcoal. Patties are prepared and these are incubated at room temperature for 4 to 5 days until the ova hatch and larvae are produced. The larvae are then collected and used to inoculate healthy mice. It has been found that an inoculum of 40 larvae per mouse yields a flourishing infestation consisting of about 30 adult worms after a 14-day developmental period. Established anthelmintics have been found to be ineffective against an inoculum of this size.

The test with *N. muris* involves collecting fecal matter of infected rats and setting up fecal cultures in the same way as for *N. dubius*. The cultures (charcoal patties) are incubated at 26° C. for 7 days. The larvae are then collected and used to inoculate healthy mice. An inoculum of 500 larvae and 1.25 mg. hydrocortisone acetate subcutaneously into young weanling mice produces a flourishing infestation.

*S. obvelata*, the pin-worm of rats and mice is allowed to maintain itself naturally within the building colony so that practically all mice infected with *N. dubius* and *N. muris* are also infected with *S. obvelata*.

DETAILED DESCRIPTION OF THE INVENTION

As noted above, these products are effective to a significant degree in controlling helminthiasis in animals, including man, by both the oral and parenteral routes of administration. Subcutaneous and intramuscular injections are the preferred methods of parenteral injection for several reasons: simplicity, convenience and the compounds appear less toxic. According to this method of the present invention, anthelmintic agents described herein or their non-toxic acid addition salts are administered parenterally, e.g. by subcutaneous or intramuscular injection, to animals suffering from helminthiasis of various types in a dosage equivalent to from about 5 mg. to about 150 mg. of the free base/kg. of body weight. A single injection is generally sufficient but, in the event multiple doses are employed, the injection can be repeated at regular, e.g. monthyl, intervals, or more frequently if desired. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame) and other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as local anesthetics and inorganic salts to afford desirable pharmacological properties.

Administration of these anthelmintic agents in combination with hyaluronidase avoids local irritation. An increase in the rate of absorption of the drug is observed and the pain due to swelling and distention is greatly reduced if not completely eliminated. Hyaluronidase levels of at least about 150 (U.S.P.) units are very effective in this respect. Higher or lower levels can, of course, be used but 150 units per dose appears to give consistently good results as evidenced by the absence of edema and the general behavior of the animal following injection of the drug preparation.

When administered by the oral route, the preferred route for administering the novel products of this invention, the novel products of this invention are given in dosages equivalent to from about 1 mg. to about 150 mg. of free base/kg. of body weight. This can be achieved by a number of methods including mixing with the feed, dosage unit formulations such as capsules, tablets, liquid mixtures and solutions including drench solutions, or they can be administered in admixture with minerals such as sodium chloride which are frequently fed to animals as a supplement. Although the dosage specified is based on active ingredient, namely the base form of the cyclic amidine, in practical use the non-toxic acid addition salts specified and the free base can be used interchangeably; except as otherwise noted below.

For therapeutic use, a dosage equivalent to 1 to 100 mg. of free base/kg. of body weight is recommended. Ordinarily a single dose is sufficient but in the event multiple doses are employed, this dose is repeated on 2 or 3 consecutive days. Since the present method is effective against not only the mature worms but also against the larval stages, it is not necessary to repeat the dosage after a period of 2 to 3 weeks as is commonly done with prior anthelmintic agents. For administration to sheep, goats, cattle, horses and swine on a therapeutic basis, a drench solution which is squirted down the animal's throat by a means of a drenching syringe is convenient. For this purpose an aqueous solution of a water soluble non-toxic salt is generally used. From the standpoint of convenience and ease of preparation the hydrochloride salts are favored. Solutions having concentrations ranging from about 3% up to the limit of solubility of the salt in water are satisfactory for drench solutions. More dilute solutions, however, can be supplied for drinking purposes. A 0.1% solution is useful.

For prophylactic use, 1 to 50 mg. (calculated as free base) per kg. of body weight daily is administered. The above methods of administration are suitable although administration in the animal's food, water, or mineral mixture is more convenient.

Boluses and capsules are also used for the therapeutic treatment of animals. For animals weighing from 30 to 1000 pounds the usual dose, calculated as free base, ranges from ½ to 45 grams. Boluses of suitable sizes containing these materials can be prepared by conventional methods.

Dry mineral mixtures or pre-mixes containing the products of this invention are prepared containing from 0.01 to about 10% of the active ingredient mixed with salt (sodium chloride) and other minerals with which it is desired to treat the animal. This can then be fed on an ad libitum basis by adjusting the proportion of active ingredient in the mixture to the average daily consumption per animal so as to provide the proper daily dose as specified above. If prepared feed supplements are employed, the material can be administered in admixture with the feed. Again, a concentration range of about 0.01 to 10% of the drug in the feed is employed. However, higher proportions can be satisfactorily employed depending upon the palatability of the product to the animal. This can be readily determined by simple experimentation. It is generally advisable to mix the daily dose with only a portion of the animal's average daily allotment to insure complete consumption of the dose. The balance of his daily feed supplement can then be fed after consumption of the medicated portion in the usual fashion. These methods are particularly useful for prophylactic treatment, but similar compositions can be employed for therapeutic use. Concentrations of drug in the feed or mineral mixture up to from 2 to 5%, depending again upon the palatability of the material, are sometimes useful. Additionally, these compounds can be used in micronized form especially when used in emulsions or suspensions by either the oral or parenteral route of administration. The active ingredients may be added in minor proportions to conventional feeds as mentioned. Any animal feed composition may be prepared to comprise the usual nutritional balance of energy, proteins, minerals, and vitamins together with a mixture of the cyclic amidines as described above. Some of the various components are commonly grains such as ground grain, and grain by-products; animal protein substances, such as meat and fish by-products; vitaminaceous mixtures, e.g. vitamin A and D mixtures, riboflavin supplements and other vitamin B complexes; and bone meal, limestone, and other inorganic compounds to provide minerals.

The relative proportions of the active ingredient in feeds and feed concentrates may vary somewhat, depending upon the feed with which they are employed and the animal consuming the same. These substances are advantageously combined in such relative proportions with edible carriers to provide concentrates which may readily be blended with standard nutritionally balanced feeds or which may be used themselves as an adjunct to the normal feedings.

A wide variety of carriers may be employed in the preparation of concentrates containing the aforesaid supplements. Suitable carriers include the following: soybean oil meal, corn gluten meal, cotton seed oil meal, sunflower seed meal, linseed oil meal, cornmeal, limestone and corncob meal. The carrier facilitates uniform distribution of the active materials in the finished feed with which the concentrate is blended. This is especially important because only a small proportion of these potent materials are required. The concentrate may be surface coated, if desired, with various proteinaceous materials, or edible waxes, such as zein, gelatin, microcrystalline wax and the like to provide a protective film which seals in the active ingredients. It will be appreciated that the proportions of the active ingredient in such concentrates are capable of wide variation since the amount of active materials in the finished feed may be adjusted by blending the appropriate proportion of concentrate with the feed to obtain the desired degree of supplementation. In the preparation of high potency concentrates, i.e. premixes, suitable for blending by feed manufacturers to produce finished feeds or concentrates of lower potency, the cyclic amidine content may range from about 0.1% to 10% per pound of concentrate as previously noted. The high potency concentrates may be blended by the feed manufacturer with proteinaceous carriers, such as soybean oil meal, to produce concentrated supplements which are suitable for direct feeding to animals. In such instances, the animals are permitted to consume the usual diet of corn, barley and other fibrous grains and the like.

The concentrates described may also be added to animal feeds to produce a nutritionally balanced, finished feed containing from about 1.0 to about 50 g. of the anthelmintic per ton of feed. In the case of ruminants, the finished feed should contain protein, fat, fiber, carbohydrate, vitamins and minerals, each in an amount sufficient to meet the nutritional requirements of the animal for which the feed is intended. Most of these substances are present in naturally occurring feed materials, such as alfalfa hay or meal, cracked corn, whole oats, soybean oil meal, corn silage, ground corn cobs, wheat bran, and dried molasses. Bone meal, limestone, iodized salt and trace minerals are frequently added to supply the necessary minerals, and urea to provide additional nitrogen.

In the case of non-ruminant animals, such as hogs, a suitable feed may contain from about 50 to 80% of grains, 3 to 10% animal protein, 5 to 30% vegetable protein, 2 to 4% of minerals, together with supplementary vitaminaceous sources.

As is well known to those skilled in the art, the types of diets are extremely variable depending upon the purpose, type of feeding operation, species, etc. Specific diets for various purposes are listed by Morrison in the Appendix of "Feeds and Feeding," The Morrison Publishing Company, Clinton, Iowa, 1959.

Those compounds of this invention wherein X is vinylene (trans) are light sensitive, particularly in solution, and undergo conversion to several products including the cis isomer. They must, therefore, be protected from light by suitable means, e.g. storage in the dark, in brown bottles, dark capsules, etc.

The significant anthelmintic activity of the compounds of this invention is indeed surprising and unexpected in view of the fact that 2-(2'-thenyl)imidazoline (the compound wherein $R_1$ is hydrogen, Y is ethylene and X is methylene), the preparation and antimalarial action of which are described in U.S. 2,457,047, exhibits little or no anthelmintic activity. It was found to be virtually inactive against Nematospiroides dubius in mice when administered orally on 3 successive days at a dose level of 500 mg./kg. of body weight. The corresponding 2-(2'-thenyl)tetrahydropyrimidine ($R_1$ is hydrogen, Y is trimethylene and X is methylene) was also found to be virtually inactive at this regimen.

The compounds of this invention on the other hand are significantly effective against N. dubius in mice 2-[2-(2-thienyl)ethyl]-$\Delta^2$-imidazoline hydrochloride and 2-[2-(2-thienyl)ethyl]-$\Delta^2$-tetrahydropyrimidine hydrochloride, for example, exhibit high activity against N. dubius at doses of 3× 100 mg./kg.

The novel products of this invention can be prepared by known methods, such as the reaction of the appropriate alkylenediamine tosylate with the desired ω-(2-thienyl)substituted nitrile, such as ω-(2-thienyl)propionitrile or ω-(2-thienyl)butyronitrile to give the tosylate salt of the cyclic amidine. Alternatively, the imino-ether hydrochlorides corresponding to the above mentioned nitriles can be reacted with the appropriate alkylenediamine to give the hydrochloride of the cyclic amidine. In still another modification, an ester of the ω-(2-thienyl)alkanoic acid, such as methyl-3-(2-thienyl) propionate, acrylate or butyrate can be reacted with the desired alkylenediamine to give the cyclic amidine free base.

The compounds wherein X is vinylene are prepared by the above methods or by reaction of 2-thienylacrylamide with 1,3-propanesultone (Ried & Schmidt, Ann. 676, 114 (1964)) to produce 3-(1'-imino(3-thienylallyloxy))-propane sulfonic acid, an imino ether in which the newly introduced radical is 3-propylsulfonic acid. The thus produced imino ether is then reacted with the appropriate diamine, e.g. ethylenediamine, trimethylenediamine, or the N-monomethyl derivatives thereof to give the desired cyclic amidine. The compounds thus produced have the trans configuration. The cis isomers are obtained by irradiation of the trans isomers as described herein.

Another method, indeed the favored method, for making those compounds of this invention wherein X is vinylene comprises the condensation of the appropriate thiophene carboxaldehyde, e.g. thiophene-2-carboxaldehyde, with a 2-methyl-$\Delta^2$-tetrahydropyrimidine or a 2-methyl-$\Delta^2$-imidazoline as is described in Belgian specification 681,413. The preferred method comprises conducting this condensation in the presence of a chemical water scavenger such as an ester of formic acid or of carbonic acid, e.g. methyl formate and dimethyl carbonate.

The tosylate and hydrochloride salts prepared as described above can be readily converted to the free base simply by neutralization of the acid portion of the salt by aqueous sodium or potassium hydroxide and the water insoluble free base recovered by mechanical means or by solvent extraction with a suitable imiscible solvent such as ethyl acetate. The free base, isolated by removal of the solvent, can, if desired, be purified by recrystallization from a suitable solvent system or by vacuum distillation. Alternatively, the free bases are obtained by neutralization of an acid salt with sodium methoxide in methanol and recovery of the base by known methods. Other acid addition salts can be readily prepared simply by dissolving the free base in a suitable solvent, e.g., acetone, water, a lower aliphatic alcohol (ethanol, isopropanol) containing the desired acid, or to which the desired acid is subsequently added. The salts are recovered by filtration, precipitation with a non-solvent, by evaporation of the solvent or, in the case of aqueous solutions, by lyophilization. In this manner the sulphate, nitrate, phosphate, acetate, propionate, butyrate, citrate, gluconate, benzoate, pamoate, amsonate, the tartrate, 3-hydroxy-2-naphthoate and the sulphosalicylate and other salts can be prepared.

The tosylate salts of the cyclic amidines produced as described above can be converted to the corresponding hydrochloride salts by percolating a methanolic solution of the tosylate through the chloride form of an anion exchange resin. Other acid addition salts can also be prepared by this method.

Resin adsorbates of the cyclic amidines of this invention are conveniently prepared by slurrying an aqueous solution of a water soluble salt of the cyclic amidine of choice with a suspension of the sodium form of a cation exchange resin for a sufficient period to permit adsorption of the compound by the resin. Suitable resins are the strong sulfonic acid type cation resins, such as Dowex 50, Amberlite CG–120, Amberlite IR–120, Zeo-Karb 225 (available from the Dow Chemical Co., Rohm & Haas, and the Permutit Co., Ltd., respectively), all of which are sulfonated styrene divinyl-benzene polymers cross-linked to varying degrees.

The ω-(2-thienyl)propionitriles can be conveniently prepared by a novel sequence comprising a Knoevenagel type condensation of the appropriate 2-thiophenecarboxaldehyde with cyanoacetic acid in the presence of an appropriate catalyst, e.g. ammonia, primary or secondary amines, pyridine, piperidine, ammonium acetate-pyridine, followed by catalytic hydrogenation of the thus produced ω-(2-thienyl)acrylonitriles. The fact that hydrogenation of the ω-(2-thienyl)acrylonitriles can be conducted over a noble metal catalyst, e.g. palladium, platinum, rhenium, rhodium, iridium, osmium, is most unexpected. Palladium-on-carbon is especially effective in affording a smooth reaction and satisfactory yields. As solvent system a suitable reaction-inert solvent should be used. Methanol and other alcohols, aqueous tetrahydrofuran and aqueous dioxane, are satisfactory solvents. The reaction system can be neutral, basic or acidic. A basic system is generally favored since it markedly accelerates the rate of reaction. Bases of particular value in this respect are the inorganic bases, e.g. the alkali metal hydroxides, especially sodium and potassium hydroxide, and the quaternary ammonium hydroxides, e.g. $R_1R_2R_3R_4NOH$ wherein $R_1$, $R_2$, $R_3$ and $R_4$ are alkyl; $R_3$ and $R_4$ are benzyl and alkyl substituted benzyl, such as trimethylbenzylammonium hydroxide, (p-t-butyl)benzyltrimethylammonium hydroxide, and di-(p-t-butylbenzyl)dimethylammonium hydroxide. The amount of base used is not critical but in general a molar ratio from about 0.05 to about 0.25 moles of base per mole of ω-(2-thienyl)acrylonitrile is satisfactory. The pressure and temperature appear not to be critical factors. Pressures of up to about 500 p.s.i. afford good yields. Reaction temperatures up to 100° C. can be used. The reaction should be stopped when the theoretical amount of hydrogen is taken up.

The following examples are provided to illustrate in greater detail the manner of practicing the present invention. (The dosages used in the following examples are calculated as the free base.)

EXAMPLE I

2-[2-(2-thienyl)ethyl]-Δ²-imidazoline hydrochloride

A 500 cc. Erlenmeyer flask is charged with 13.7 g. (0.1 mole) of 3-(2-thienyl)propionitrile, 6.5 g. (0.11 moles) of ethylenediamine, and 19.0 g. (0.1 mole) of p-toluenesulfonic acid monohydrate. The mixture is heated at 175° C. for 8 hours during which time the evolution of ammonia is noted. After cooling, the resulting glass is recrystallized from 2-propanol to yield 9 g. of crystalline material, melting point 104–106° C. A second crop of 10.5 g. is obtained, melting point 100–104° C.

The first and second crops of the toluenesulfonate salt are dissolved in water and treated with aqueous sodium hydroxide until a strongly basic solution is obtained. The solution is then extracted 3 times with ethyl acetate. The combined extracts are dried, filtered and evaporated under reduced pressure to yield a white solid material which is recrystallized from acetone and hexane to give colorless platelets of the imidazoline free base, M.P. 99–101° C. The free base is dissolved in methanol and treated with an exact equivalent of hydrogen chloride in methanol. The solvent is then evaporated and the colorless solid recrystallized from 2-propanol/ether to give the desired product. Alternatively, the p-toluenesulfonate salt in methanol may be passed through a chloride anion exchange column to give eventually the hydrochloride.

In like manner, 2[2-(2-thienyl)ethyl]-Δ²-tetrahydropyrimidine hydrochloride (M.P. 171–172° C.; free base, M.P. 94–96° C.) is prepared by substituting trimethylenediamine for ethylenediamine.

EXAMPLE II

2-[2-(2-thienyl)ethyl]-Δ²-imidazoline hydrochloride

Methyl β-(2-thienyl)propionimidate hydrochloride (8.5 g., prepared by conventional procedure from the nitrile of Preparation B and methanol) is dissolved in dry methanol (40 ml.) and ethylenediamine (2.7 g.) added. The mixture is refluxed for one and one-half hours, the solvent then evaporated off and the residue recrystallized several times from isopropyl alcohol-ether to give a white microcrystalline solid; M.P. 142.5–143.5° C.

EXAMPLE III 1-methyl-2-[2-(3-methyl-2-thienyl)]ethyl-Δ²-tetrahydropyrimidine Methyl β-(3-methyl-2-thienyl)propionimidate hydrochloride (31.8 g., prepared from the corresponding nitrile of Preparation B and methanol by conventional procedure) is added to a solution of N-methyltrimethylenediamine (18.5 g.) in methanol (250 ml.) at 0° C. The mixture is refluxed overnight then evaporated to dryness under reduced pressure.

The residue is treated with 100 ml. of 40% aqueous sodium hydoxide at about 5° C., shaken for several minutes then extracted with ether. The ethereal solution is dried with anhydrous sodium sulfate then evaporated. Extraction of the aqueous solution with chloroform provides an additional quantity of the desired base. The combined bases from the extractions are distilled in vacuo to give the free base.

The hexafluorophosphate salt is obtained by adding the base to an ice-water mixture containing an equimolar proportion of hexafluorophosphoric acid. The salt precipitates, is filtered off and recrystallized from 2-propanol; M.P. 116.5–117.5° C.

*Analysis*—Calcd. for $C_{12}H_{19}F_6N_2PS$ (percent): C, 39.12; H, 5.19; N, 7.61. Found (percent): C, 39.30; H, 5.32; N, 7.61.

The following compounds are similarly prepared from the appropriate reactants:

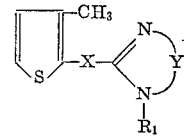

| $R_1$ | X | Y |
|---|---|---|
| H | —CH₂CH₂— | —CH₂CH₂— |
| H | —CH₂CH₂— | —CH₂CH₂CH₂— |
| H | —CH₂CH₂CH₂— | —CH₂CH₂— |
| H | —CH₂CH₂CH₂— | —CH₂CH₂CH₂— |
| CH₃ | —CH₂CH₂— | —CH₂CH₂— |
| CH₃ | —CH₂CH₂CH₂— | —CH₂CH₂— |
| CH₃ | —CH₂CH₂CH₂— | —CH₂CH₂CH₂— |

EXAMPLE IV

2-[2-(2-thienyl)ethyl]-Δ²-tetrahydropyrimidine hydrochloride

Methyl β-(2-thienyl)propionimidate hydrochloride (8.5 g.) is dissolved in dry methanol (40 ml.) and trimethylenediamine (3.4 g.) is added. The resultant mixture is refluxed for one and a half hours, the solvent evaporated off and the residue is recrystallized several times from isopropyl alcohol-ether to give a white microcrystalline solid; M.P. 166.5–167.5° C.

*Analysis*.—Calcd. for $C_{10}H_{15}ClN_2S$ (percent): C, 52.02; H, 6.51; Cl, 15.40; N, 12.14; S, 13.88. Found (percent): C, 52.38; H, 6.54; Cl, 15.64; N, 12.80; S, 13.57.

EXAMPLE V

2-[3-(2-thienyl)propyl]-Δ²-tetrahydropyrimidine hydrochloride

Methyl γ-(2-thienyl)butyrimidate hydrochloride (10.0 g.) is dissolved in dry methanol (25 ml.) and trimethylenediamine (3.4 g.) added. The mixture is refluxed for one and a half hours. The solvent is evaporated off and the residue recrystallized several times from isopropyl alcohol-ether, the product being obtained as a white microcrystalline solid; M.P. 138–9° C.

*Analysis*.—Calcd. for $C_{11}H_{17}ClN_2S$ (percent): C, 53.97; H, 7.00; Cl, 14.49; N, 11.45; S, 13.10. Found (percent): C, 53.58; H, 6.97; Cl, 14.36; H, 11.08; S, 12.93.

EXAMPLE VI

The following compounds can be conveniently prepared by the procedures of Examples I and II from the appropriate reactants. The necessary 3-(2-thienyl)propionitrile can be obtained according to the procedure of Cagniant, et al., Bull. soc. chim. France, 1083–7 (1948). This procedure involves the Grignard reaction of 2-iodothiophene and ethylene oxide to give 2-(2-hydroxyethyl)thiophene. Treatment of the alcohol with phosphorous tribromide and then with sodium cyanide produces the desired 3-(2-thienyl) propionitrile. 4(2-thienyl)butyronitrile can be obtained by dehydration of the corresponding amide as follows. A stirred solution of 18.0 g. of 4-(2-thienyl) butyramide and 60 ml. of pyridine is cooled in an ice-bath. Benzenesulfonyl chloride (18.5 g.) is then gradually added while maintaining the reaction temperature below 5° C. The mixture is allowed to warm to room temperature, stirred overnight, then poured into 400 ml. of ice water. The aqueous solution is adjusted to pH 1 then extracted with diethyl ether (3 × 100 ml.). The combined extracts are dried over anhydrous MgSO₄, filtered and evaporated to give 4-(2-thienyl) butyronitrile. The iminoethers can be prepared according to standard procedures. ($R_2$=hydrogen in the following compounds).

| $R_1$ | X | Y* | Procedure of Example— |
|---|---|---|---|
| CH₃ | —CH₂—CH₂— | Eth tri | II |
| CH₃ | —CH₂—CH₂—CH₂ | Eth tri | II |
| H | —CH₂—CH₂—CH₂ | Tri eth | II |

*Eth=Ethylene; Tri=Trimethylene.

EXAMPLE VII

2-[2-(2-thienyl)ethyl-Δ² - imidazoline hydrochloride is dissolved in water (10% solution) and neutralized by the slow addition of 6 N sodium hydroxide with vigorous stirring. The insoluble base is collected by filtration, washed with water until free of chloride then dried in air.

In like manner the remaining hydrochloride salt of Example I and those of Examples IV–VI can be converted to their respective free bases.

EXAMPLE VIII (A) 2-[2-(2-thienyl)ethyl]-Δ²-imidazoline (0.02 mole) is added to 300 ml. of warm alcohol containing 0.01 mole of pamoic acid. The mixture is stirred for 3 hours then filtered to give di-2 - [2-(2-thienyl)ethyl]-Δ²-imidazoline pamoate.

(B) 2 - [3-(2-thienyl)propyl]-Δ²-tetrahydropyrimidine citrate can be prepared by adding 0.01 mole of the free base, 2- 3-(2-thienyl)propyl]Δ²-tetrahydropyrimidine, to 25 ml. of a warm methanol solution of 0.01 mole citric acid. The resulting clear solution is evaporated to give the salt.

By means of these procedures the amsonate, pamoate, 2-hydroxy-3-naphthoate, sulfosalicylate, acetate, propionate, butyrate, gluconate, benzoate, citrate, stearate, sulfate, phosphate and nitrate salts of the products of Example VII can be prepared.

EXAMPLE IX

2 - [2-(2-thienyl)ethyl]-Δ²-tetrahydropyrimidine hydrochloride (5 g.) is dissolved in water (25 ml.), the solution filtered and added to a well-stirred suspension of Amberite CG–120 (sodium form of a cation exchange resin) (5.9 g.) in 100 ml. water. The mixture is stirred for 3 hours then filtered, washed with water and dried in vacuo. Nitrogen analysis shows approximately 41% base to be adsorbed.

Resin adsorbates of the products of Examples I, V and VI can be prepared in like manner.

EXAMPLE X 1-methyl-2-[2-(2-thienyl)vinyl]-Δ²-tetrahydropyrimidine citrate

Method A.—2-thienylacrylamide (23.4 g.) and 1,3-propanesultone (18.7 g.) are heated at 130–140° C. with rapid stirring. Afte 0.5 hours the melt solidifies to a hard mass. The mixture is heated for a further 0.5 hours, cooled, crushed to a fine powder then triturated with acetone and filtered. The iminoether is obtained as a pale yellow solid (38.9 g., 92.5% yield); M.P. 198–200° C. The crude product, 3-(1'-imino(3-thienylallyloxyl)propane sulfonic acid, is used directly for the next stage without further purification. The iminoether (3.2 g.) and N-methyltrimethylenediamine (1.05 g.) are refluxed together in dry ethanol (50 cc.) for 1.5 hours, the solvent then removed under vacuum, and the residue dissolved in water. The aqueous solution is treated with charcoal and filtered. The filtrate is made alkaline with 5 N NaOH, and extracted with chloroform. The organic phase is washed with saturated sodium chloride solution, dried over sodium sulphate, then evaporated to dryness. The residue is dissolved in isopropanol, acidified with citric acid in the same solvent and the salt precipitated by adding ether. Three recrystallizations from methanol provide a pale yellow solid (1.3 g., 28% yield); M.P. 178–179° C.

*Analysis.*—Calcd for $C_{17}H_{22}N_2O_7S$ (percent): C, 51.24; H, 5.57; N, 7.03; S, 8.05. Found (percent): C, 51.29; H, 5.69; N, 6.88; S, 7.86.

Method B.—Methyl β-(2-thienyl)acrylimidate hydrochloride (10.2 g., prepared in the usual way from the 3-(2-thienyl)acrylonitrile of Preparation A and methanol except that the mixture is cooled to −10° C. while saturating with hydrogen chloride) is dissolved in methanol (40 ml.) and added to a solution of N-methyltrimethylene diamine (44 g.) in methanol (60 ml.) at 5–10° C. The mixture is allowed to warm to room temperature, heated to reflux for three hours then evaporated to dryness. The residue is taken up in water (30 ml.) then poured into an ice-cold stirred mixture of 2 N sodium hydroxide (75 ml.) and methylene chloride (75 ml.). The ether phase is promptly separated, dried (Na₂SO₄) and evaporated to give the free base.

The base is dissolved in methanol and treated with a solution of citric acid (8.6 g.) in methanol. The citrate salt is precipitated by the addition of ether and purified by recrystallization from methanol.

Using the appropriate reactants the following compounds are prepared by the above procedures.

| | | | | | Percent | | | |
|---|---|---|---|---|---|---|---|---|
| $R_1$ | $R_2$ | Y | Salt | M.P., °C. | C | H | N | S |
| H | H | Tri | Maleate | 153–155 | 54.30 | 5.21 | 9.44 | 10.73 |
| CH₃ | H | Eth | p-Toluene sulfonate | 162–164 | 56.09 | 5.48 | 7.59 | 17.83 |
| H | H | Eth | Maleate | 162–163 | 53.48 | 4.76 | 9.49 | 10.90 |
| CH₃ | CH₃ | Tri | Hydrochloride | 239–241 | 55.58 | 6.80 | 11.01 | |

EXAMPLE XI 1-methyl-2-[2-(2-thienyl)vinyl]-Δ²-tetrahydropyrimidine tartrate trans isomer The citrate salt of Example X is added to a cold, stirred aqueous solution (50%) of potassium hydroxide (in a 1:1 molar ratio) and 3 volumes of ether. After stirring a few minutes the ether layer is separated and the aqueous phase extracted again with ether. The ether layers are combined, dried over anhydrous magnesium sulfate and decolorized with charcoal. Removal of the ether affords the base.

The base is taken up in ethanol, stirred, and an ethanolic solution of tartaric acid added slowly (1:1 molar ratio). The tartrate salt crystallizes and is recovered by filtration. It is purified by dissolution in methanol, decolorization, and dilution with 2.5 volumes of ethanol. Concentration of the clear solution to small volume yields the pure, crystalline product; M.P. 147–148° C.

*Analysis.*—Calcd. for $C_{15}H_{20}N_2O_6S$ (percent): C, 50.55; H, 5.76; N, 7.57; S, 9.00. Found (percent): C, 50.56; H, 5.66; N, 7.86; S, 9.00.

Cis isomer

A stirred solution of trans-I-methyl-2-[2-(2-thienyl)vinyl]-$\Delta^2$-tetrahydropyrimidine tartrate (3.0 g.) in methanol (300 ml.) is irradiated under an atmosphere of nitrogen by 550-watt Hanovia high pressure quartz lamp for 15 hours. Evaporation of the solvent under reduced pressure affords the cis isomer. Purification is accomplished as described above for the trans isomer.

The pure cis isomer melts at 160–161° C.

The remaining products of Example X are converted to their respective cis isomers by this procedure.

EXAMPLE XII

Repetition of the procedure of Examples X and XI but using the proper acid in place of citric, maleic and p-toluene sulfonic acids permits preparation of the following salts of compounds having the above formula.

| $R_1$ | $R_2$ | Y | Salt |
|---|---|---|---|
| $CH_3$ | H | Tri | Hydrochloride. |
| $CH_3$ | H | Tri | Pamoate. |
| $CH_3$ | H | Tri | Acetate. |
| $CH_3$ | H | Eth | Tartrate. |
| $CH_3$ | H | Eth | Fumarate. |
| $CH_3$ | H | Eth | Laurate. |
| $CH_3$ | H | Tri | Sulfate. |
| H | H | Tri | Amsonate. |
| H | H | Eth | Phosphate. |
| H | H | Eth | 3-hydroxy-2-naphthoate. |
| $CH_3$ | $CH_3$ | Tri | Citrate. |
| $CH_3$ | $CH_3$ | Tri | Tartrate. |
| $CH_3$ | $CH_3$ | Tri | Sulphosalicylate. |
| $CH_3$ | $CH_3$ | Tri | Gluconate. |

EXAMPLE XIII 1-methyl-2-[2-(2-thienyl)ethyl]-$\Delta^2$-imidazoline

Methyl $\omega$-(2-thienyl)propionimidate hydrochloride (87.3 g.), prepared by the conventional procedure from $\omega$-(2-thienyl)propionitrile, is dissolved in dry methanol (175 ml.), and to the solution N-methyl ethylene diamine (33.2 g.) is added with cooling. The resulting solution is heated under reflux for 1½ hours, cooled and neutralized with methanolic sodium hydroxide. The solution is concentrated, then cooled, and the precipitated sodium chloride filtered off. The solvent is then distilled off from the filtrate, and the residue distilled in vacuo. The base is obtained as an almost colorless oil, B.P. 134–6° C./1.2 mm., $n_D^{24}$ 1.5570.

*Analysis.*—Calcd. for $C_{10}H_{14}N_2S$ (percent): C, 61.83; H, 7.27; N, 14.42; S, 16.48. Found (percent): C, 62.02; H, 7.12; N, 14.64; S, 16.79.

In like manner, but using methyl $\omega$-(2-thienyl)propionimidate hydrochloride (18.2 g.) dissolved in dry methanol (40 ml.) and N-methyl trimethylenediamine (7.8 g.), 1-methyl-2-[2-(2-thienyl)ethyl]-$\Delta^2$-tetrahydropyrimidine, is produced as an almost colorless oil, B.P. 122–123° C./0.4 mm., $n_D^{24}$ 1.5648.

EXAMPLE XIV 1-methyl-2-[2-(2-thienyl)ethyl]-$\Delta^2$-imidazoline p-toluene sulfonate Method A.—The base (5 g.) is dissolved in dry ether (20 ml.), and p-toluene sulphonic acid (4.5 g.) dissolved in a mixture of dry methanol (10 ml.) and ether (100 ml.) is added. The oil which precipitates solidifies on cooling and trituration with ether. After several recrystallizations from isopropanol-ether the p-toluene sulphonate salt is obtained as colorless crystals, M.P. 104–105.5° C.

*Analysis.*—Calcd. for $C_{17}H_{22}N_2S_2O_3$ (percent): C, 55.75; H, 6.06; N, 7.76; S, 17.49. Found (percent): C, 55.91; H, 6.39; N, 7.76; S, 17.35.

Method B.—This method illustrates the preparation of the p-toluene sulphonate salt direct from $\omega$-(2-thienyl)propionitrile, N-methyl ethylene diamine and p-toluene sulphonic acid.

$\omega$-(2-thienyl)propionitrile (13.7 g.), N-methyl ethylene diamine (8.15 g.) and p-toluene sulphonic acid (19 g.) are mixed and heated to 175° C. during one hour, this temperature being maintained for a further ten hours. The reaction mixture is cooled, and the glass that forms dissolved in hot isopropanol. The product is crystallized by addition of warm ether and allowing the mixture to cool. After several recrystallizations the p-toluene sulphonate salt is obtained as colorless crystals, M.P. 104–5° C.

EXAMPLE XV 1-methyl-2[2-(2-thienyl)ethyl]-$\Delta^2$-imidazoline citrate

Citric acid (2.1 g.) is dissolved in dry acetone (50 ml.), and to the solution the base (1.9 g.) dissolved in dry acetone (10 ml.) is added. The precipitated citrate, which solidifies on scratching, is obtained as a colorless crystalline material, M.P. 141–2° C., after several recrystallizations from methanol-ether.

*Analysis.*—Calcd. for $C_{16}H_{22}N_2O_7S$ (percent): C, 49.74; H, 5.74; N, 7.25; S, 8.28. Found (percent): C, 49.87; H, 5.86; N, 7.13; S, 8.22.

EXAMPLE XVI 1-methyl-2-[2-(2-thienyl)ethyl]-$\Delta^2$-imidazoline phosphate

The base (1.9 g.) is dissolved in isopropanol (15 ml.) and the solution added to 85% phosphoric acid (1.15 g.) dissolved in isopropanol (30 ml.). The colorless solid which precipitates immediately is recrystallized several times from methanol-ether to give the phosphate salt as colorless crystals, M.P. 191–192.5° C.

*Analysis.*—Calcd. for $C_{10}H_{17}N_2O_4PS$ (percent): C, 41.12; H, 5.86; N, 9.58; P, 10.62; S, 10.95. Found (percent): C, 41.28; H, 6.03; N, 9.62; P, 10.30; S, 10.93.

EXAMPLE XVII 1-methyl-2-[2-(2-thienyl)ethyl]-$\Delta^2$-imidazoline sulfate

The base (1 g.) is dissolved in ether, and under strong cooling one molecular equivalent of concentrated sulphuric acid is slowly added. The oil which precipitates solidifies on scratching. After several recrystallizations from isopropanol the sulphate is obtained as colorless plates; M.P. 74.5–75° C.

*Analysis.*—Calcd. for $C_{10}H_{16}N_2O_4S_2$ (percent): C, 41.10; H, 5.51; N, 9.59; S, 21.93. Found (percent): C, 41.05; H, 5.25; N, 10.03; S, 22.03.

EXAMPLE XVIII

Method A

From 1-methyl-2-[2-(2-thienyl)ethyl]-$\Delta^2$-tetrahydropyrimidine the p-toluene sulphonate salt is prepared, following essentially the procedure of Example XIV, Method A.

Purification by repeated recrystallization from isopropanol-ether gives colorless crystals; M.P. 122–123° C.

*Analysis.*—Calcd. for $C_{18}H_{24}N_2S_2O_3$ (percent): C, 56.84; H, 6.31; N, 7.36; S, 16.85. Found (percent): C, 57.20; H, 6.47; N, 7.50; S, 16.83.

Method B

The p-toluene sulphonate salt is also prepared from $\omega$-(2-thienyl) propionitrile (13.7 g.), N-methyl trimethylene diamine (9.68 g.) and p-toluene sulphonic acid (19 g.) by following essentially the procedure of Example XIV, Method B, except that heating is continued for 16 hours. Repeated recrystallization from isopropanol gives the p-toluene sulphonate salt as colorless crystals; M.P. 121.5–122.5° C.

EXAMPLE XIX

From 1 - methyl-2-[2-(2-thienyl)ethyl]-Δ²-tetrahydropyrimidine a sulphate salt is prepared, following essentially the procedure of Example XVII.

Repeated recrystallization from isopropanol gives the sulphate as colorless plates; M.P. 97–99° C.

EXAMPLE XX

1-methyl-2-[2-(2-thienyl)ethyl]-Δ²-tetrahydropyrimidine nitrate

Neutralization of the base (1 g.) with N-aqueous nitric acid, followed by evaporation of the solution to dryness, and repeated recrystallization of the residue from isopropanol-ether gives the nitrate salt as colorless needles; M.P. 108.5–110° C.

*Analysis.*—Calcd. for $C_{11}H_{17}N_3O_3S$ (percent): C, 48.75; H, 6.28; N, 15.51; S, 11.81. Found (percent): C, 48.61; H, 6.34; N, 15.34; S, 11.61.

EXAMPLE XXI

Method A—1-methyl-2-[2-(2-thienyl)ethyl]-Δ²-tetrahydropyrimidine sulfosalicylate 2.8 g. 5-sulfosalicylic acid (0.013 mole) is dissolved in 1 ml. water and added to 2.1 g. of 1 - methyl-2[2-(2-thienyl)ethyl]-Δ² - tetrahydropyrimidine (0.01 mole). A clear solution forms and upon standing, a white solid separates. This is ground up, triturated in a small amount of water, filtered, and dried to give 2.6 g. of product. Recrystallization from isopropyl alcohol gives 2.2 g. of a white crystalline solid; M.P. 154–155° C.

*Analysis.*—Calcd. for $C_{11}H_{16}N_2S \cdot C_7H_6O_6S$ (percent): C, 50.69; H, 5.20; N, 6.57. Found (percent): C, 50.82; H, 5.39; N, 6.44.

Method B—1-methyl-2-[2-(2-thienyl)ethyl]-Δ²-tetrahydropyrimidine citrate

To 1.92 g. citric acid (0.01 mole) dissolved in 100 ml. acetone is added dropwise a solution of 2.08 g. 1-methyl-2-[2 - (2 - thienyl)ethyl]-Δ²-tetrahydropyrimidine (0.01 mole) in 25 ml. acetone. A white precipitate forms immediately and after stirring 2 hours is filtered off, 3.7 g.; M.P. 142–143.5° C.

*Analysis.*—Calcd. for $C_{11}H_{16}N_2S \cdot C_6H_8O_7$ (percent): N, 7.00. Found (percent): N, 7.16.

Method C—1-methyl-2-[2-(2-thienyl)ethyl]-Δ²-tetrahydropyrimidine phosphate

To 4.16 g. 1 - methyl-2-[2-(2-thienyl)ethyl]-Δ²-tetrahydropyrimidine (0.02 mole) dissolved in 25 ml. isopropyl alcohol, there is added a chilled solution of 2.3 g. $H_3PO_4$ (85%, 0.02 mole) in 75 ml. isopropyl alcohol. A gummy white precipitate forms. The solvent is decanted, 100 ml. isopropyl alcohol added, and the mixture scratched until a granular solid forms. This granular solid is filtered off, leaving behind some tacky solid which is discarded. Yield=4.0 g.; M.P. 202.5–205° C.

*Analysis.*—Calcd. for $C_{11}H_{16}N_2S \cdot H_3PO_4$ (percent): N, 9.14. Found (percent): N, 8.64.

Method D—1-methyl-2[2-(2-thienyl)ethyl]-Δ²-tetrahydropyrimidine hydrochloride To 2.08 g. 1-methyl-2-[2-(2-thienyl)ethyl]-Δ²-tetrahydropyrimidine (0.01 mole) dissolved in 75 ml. ether a solution of 0.365 g. dry HCl gas in 10 ml. ether is added dropwise with stirring. The oil which forms becomes tacky on standing. The solvent is decanted and more ether added to the tacky mass which is scratched with a glass rod until a solid forms. The solvent is decanted and the light tan residue stripped to dryness on a rotary evaporator to give 2.1 g. of an extremely hygroscopic solid. It sinters about 100° C. and melts at 113–118° C.

EXAMPLE XXII

1-methyl-2-[2-(3-methyl-2-thienyl)vinyl]-Δ²-tetrahydropyrimidine hydrochloride A mixture of 12.6 g. (0.10 mole) of 3 - methylthiophene-2-carboxaldehyde, 11.2 g. (0.10 mole) of 1,2-dimethyl-1,4,5,6 - tetrahydropyrimidine, 1.5 ml. of piperidine and 25 ml. of benzene is refluxed under an atmosphere of nitrogen in an apparatus equipped with a Dean-Stark apparatus for four hours. The mixture is concentrated in vacuo to remove benzene and piperidine. The residue is taken up in 150 ml. of 1 N hydrochloric acid and the solution washed with ether. The aqueous acid solution is then extracted with chloroform and the chloroform solution decolorized and dried over anhydrous sodium sulfate. Evaporation of the chloroform yields the product as a yellow solid which is recrystallized twice from chloroform/benzene; M.P. 239–241° C.

*Analysis.*—Calcd. for $C_{12}H_{17}N_2SCl$ (percent): C, 56.12; H, 6.67; N, 10.91. Found (percent): C, 55.58; H, 6.80; N, 11.01.

Repetition of this procedure but using the appropriate reactants produces the following compounds as their hydrochloride salts:

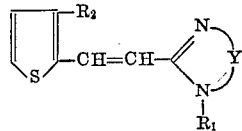

| $R_1$ | $R_2$ | Y |
|---|---|---|
| H | H | Eth |
| H | H | Tri |
| H | $CH_3$ | Eth |
| H | $CH_3$ | Tri |
| $CH_3$ | $CH_3$ | Eth |

EXAMPLE XXIII

Following the procedures of Examples XXI the following salts of 1-methyl-2-[2-(2-thienyl)ethyl-Δ²-tetrahydropyrimidine and of 1-methyl-2-[2-(2-thienyl)ethyl]-Δ-imidazoline are prepared, Tables I and II, respectively.

TABLE I

Salts of 1-methyl-2-[2-(2-thienyl)ethyl]-Δ²-tetrahydropyrimidine

| Salt | Method | M.P., °C. | Percent yield |
|---|---|---|---|
| Pamoate | C | 137–143 | 41.7 |
| Maleate | B | 78–80 | 89.5 |
| Stearate | No solvent | 48–53 | 100.0 |
| Laurate | No solvent | Oil | 100.0 |
| Tartrate | B | 140–142 | 38.0 |
| Malate | B | 99–100 | 79.0 |
| Fumarate | B | 149–151 | 95.0 |
| Succinate | B | 85–90 | 89.0 |
| Acetate | No solvent | Oil | 100.0 |
| Oxalate | B | 76–78 | 47.0 |

TABLE II

Salts of 1-methyl-2-[2-(2-thienyl)ethyl]-Δ²-imidazoline

| Salt | Method | M.P., °C. | Percent yield |
|---|---|---|---|
| Hydrochloride | D | 70–90 | 88.0 |
| Sulfosalicylate | A | 158–159 | 95.0 |
| Pamoate | B | 166–168 | 94.0 |
| Stearate | No solvent | 48–53 | 100.0 |
| Laurate | No solvent | Oil | 100.0 |
| Tartrate | B | 167–169 | 58.0 |
| Fumarate | B | 157–158 | 80.7 |
| Succinate | B | 107–108 | 80.0 |
| Acetate | No solvent | Oil | 100.0 |

EXAMPLE XXIV

1-methyl-2-[2-(2-thienyl)ethyl]-Δ²-imidazoline

Hydrogen sulphide is bubbled through a mixture of 2-(2-thienyl) propionitrile (250 g.) and N-methyltrimethylenediamine (160.5 g., 1:1 mole ratio) until 6.1 g. is taken up. The mixture is then heated and stirred at 70–80° C. for 2 hours. Brisk evolution of ammonia occurs. The temperature is raised and maintained at 95° C.

for 6 hours. The product is recovered by distillation in vacuo; yield—84.7%, B.P. 145–150° C. at 1.5 mm.

Hydrogen sulphide may be replaced by phosphorous pentasulphide. When used at a level of 0.013 mole per mole of reactants and heated at 70–80° C. for 2 hours followed by 95° C. for 16 hours an 82.3% yield is obtained.

EXAMPLE XXV 1-methyl-2-[2-(2-thienyl)ethyl]-$\Delta^2$-tetrahydropyrimidine amsonate Amsonic acid (1.85 g.) is dissolved in water containing 2 equivalents of sodium hydroxide. 1-methyl-2-[2-(2-thienyl)ethyl]-$\Delta^2$-tetrahydropyrimidine p-toluene sulphonate (the product of Example XVIII, 3.8 g.) dissolved in water is added slowly with stirring. The cream-colored solid which separates is removed by filtration, washed with water and dried; M.P. >300° C.

*Analysis.*—Calcd. for $C_{36}H_{46}N_6O_6S_4$ (percent): C, 54.95; H, 5.89; N, 10.68; S, 16.28. Found (percent): C, 55.17; H, 5.82; N, 10.51; S, 16.50.

EXAMPLE XXVI

2-[2-(2-thienyl)ethyl]-$\Delta^2$-tetrahydropyrimidine suramin salt

To a solution of Suramin (1.914 g./equivalent) in 10 ml. of water there is added a solution of 2-[2-(2-thienyl)ethyl]-$\Delta^2$-tetrahydropyrimidine hydrochloride (1.763 g., 6 equivalents) in water (5 ml.). A white gummy oil immediately separated. The supernatant liquors were decanted, the residue washed free of inorganic salts and dried in vacuo to constant weight. The amorphous solid melts at 145–150° C.

*Analysis.*—Calcd. for $C_{111}H_{126}N_{18}O_{23}S_{12}$ (percent): C, 54.12; H, 5.07; N, 10.24. Found (percent): C, 53.26; H, 5.21; N, 9.61.

EXAMPLE XXVII

2-[2-(2-thienyl)ethyl]-$\Delta^2$-tetrahydropyrimidine amsonate

To a solution of amsonic acid (1.9 g.) in 10 ml. water containing 2 equivalents of sodium hydroxide is added a solution of 2-[2-(2-thienyl)ethyl]-$\Delta^2$-tetrahydropyrimidine hydrochloride (2.3 g.) in 10 ml. water. The creamy solid which forms is filtered off, washed free of chloride ions and dried in vacuo; M.P. >350° C.

*Analysis.*—Calcd. for $C_{34}H_{42}N_6O_6S_4$ (percent): C, 53.70; H, 5.58; N, 11.07; S, 16.89. Found (percent): C, 54.07; H, 5.32; N, 10.44; S, 16.32.

EXAMPLE XXVIII 1-methyl-2-[2-(3-thienyl)vinyl]-$\Delta^2$-tetrahydropyrimidine Method A.—A mixture of 3-thiophencarboxaldehyde (9.77 g.), 1,2-dimethyl-$\Delta^2$-tetrahydropyrimidine (9.59 g.), and dry toluene (75 ml.) is heated under reflux for 6 hours in an apparatus fitted with a moisture trap. The reaction mixture is decanted from a small amount of black tar, the toluene distilled off in vacuo, and the residue of the desired tetrahydropyrimidine free base in crude form poured into a solution of fumaric acid (11.14 g.) in water and isopropanol (1:1:40 ml.). The fumarate salt thus formed is recrystallized from the same solvent mixture; M.P. 192.5–194° C.

*Analysis.*—Calcd. for $C_{15}H_{18}N_2O_4S$ (percent): C, 55.89; H, 5.63; N, 8.69. Found (percent): C, 55.96; H, 5.73; N, 8.65.

The above procedure yields the vinyl compound in the trans form. This can be converted to the cis form by irradiation according to the procedure of Example XI.

Following generally the above procedure, the following tetrahydropyrimidine and imidazoline compounds can be prepared from a 3-thiophencarboxaldehyde and the appropriate 2-methyl-$\Delta^2$-tetrahydropyrimidine or -imidazoline.

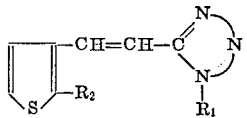

| R₁ | R₂ | Y |
|---|---|---|
| H | H | Eth |
| CH₃ | CH₃ | Tri |
| CH₃ | Cl | Eth |
| CH₃ | Br | Tri |
| H | C₂H₅ | Eth |
| CH₃ | Cl | Tri |
| H | Cl | Tri |
| H | Cl | Eth |
| H | Br | Eth |
| H | Br | Tri |
| CH₃ | Br | Eth |
| H | H | Tri |
| CH₃ | H | Eth |
| CH₃ | CH₃ | Eth |
| H | CH₃ | Tri |
| H | CH₃ | Eth |
| H | C₂H₅ | Tri |
| CH₃ | C₂H₅ | Eth |
| CH₃ | C₂H₅ | Tri |

Method B.—A solution of 3-thiophenecarboxaldehyde (0.1 mole), 1,2-dimethyl-$\Delta^2$-tetrahydropyrimidine (0.1 mole) and methyl formate (0.33 mole) is allowed to stand at room temperature for 72 hours. The methyl formate is then evaporated under reduced pressure, and the residue treated with fumaric acid (12.8 g.) as described in Method A to provide the fumarate salt.

In like manner the following compounds are prepared from the appropriate reactants:

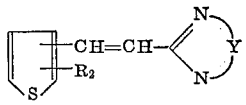

| R₁ | R₂ | Y |
|---|---|---|
| CH₃ | 2-thienyl | Tri |
| CH₃ | do | Eth |
| H | do | Tri |
| H | do | Eth |
| CH₃ | 3-methyl-2-thienyl | Tri |
| CH₃ | 3-chloro-2-thienyl | Tri |
| CH₃ | 2-methyl-3-thienyl | Tri |
| H | 3-ethyl-2-thienyl | Tri |
| CH₃ | 3-iodo-2-thienyl | Tri |

EXAMPLE XXIX 1-methyl-2-[2-(3-bromo-2-thienyl)vinyl]-$\Delta^2$-tetrahydropyrimidine A mixture of 3-bromo-2-thiophencarboxaldehyde (12 g., Preparation D) 1-2-dimethyl-$\Delta^2$-tetrahydropyrimidine (7.4 g.) and toluene (60 ml.) is heated under reflux for 4 hours in an apparatus fitted with a moisture trap.

Toluene is then distilled off in vacuo and the dark oily residue of the desired tetrahydropyrimidine free base in crude form treated with a solution of tartaric acid (15 g.) in water and isopropanol (1:1; 50 ml.). The tartrate salt thus formed crystallizes (as a monohydride) on standing at 0° C. for 16 hours and is successively recrystallized from water/isopropanol and methanol/ether; M.P. 110.5–113° C.

*Analysis.*—Calcd. $C_{15}H_{19}BrN_2O_6S \cdot H_2O$ (percent): C, 39.70; H, 4.63; N, 6.18; Br, 17.60; S, 7.07. Found (percent): C, 39.64; H, 4.42; N, 5.96; Br, 17.74; S, 6.18.

Following generally the procedure of this example, the following tetrahydropyrimidine and imidazoline compounds can be prepared from a 3-halo-2-thiophen carboxaldehyde and the appropriate 2-methyl-Δ²-tetrahydropyrimidine or -imidazoline.

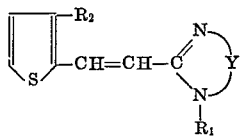

| R₁ | R₂ | Y |
|---|---|---|
| H | Br | Eth |
| H | Cl | Tri |
| CH₃ | F | Eth |
| CH₃ | Br | Eth |
| H | Br | Tri |
| H | Cl | Eth |
| CH₃ | Cl | Tri |
| CH₃ | Cl | Eth |
| H | I | Eth |
| CH₃ | I | Eth |
| H | I | Tri |
| CH₃ | I | Tri |
| H | F | Eth |
| CH₃ | F | Tri |
| H | F | Tri |

EXAMPLE XXX 1-methyl-2-[2-(3-ethyl-2-thienyl)vinyl]-Δ²-tetrahydropyrimidine

In an apparatus fitted with a moisture trap, 9.8 g. of the mixture of 3- and 4-ethyl 2-thiophencarboxaldehydes, obtained by the procedure of Preparation E, is heated for 6 hours under reflux with 1,2-dimethyl-Δ²-tetrahydropyrimidine (7.9 g.) in toluene to which a few drops of piperidine has been added.

Toluene is then distilled off in vacuo, and the residue of the desired tetrahydropyrimidine free base in crude form dissolved in a hot solution of fumaric acid (8.5 g.) in water (15 ml.). The fumarate salt of the base is precipitated by addition of isopropanol (40 ml.) followed by cooling, and the salt recrystallized several times from water-isopropanol (1:4). The product (4.5 g.), M.P. 166–171° C., is the trans form of the desired vinyl compound.

*Analysis.*—Calcd. C₁₇H₂₂N₂O₄S (percent): C, 58.26; H, 6.33; N, 8.00; S, 9.15. Found (percent) C, 58.24; H, 6.41; N, 8.12; S, 8.94.

Following generally the procedure of this example, the following tetrahydropyrimidine and imidazoline compounds can be prepared from 3-ethyl-2-thiophencarboxaldehyde and the appropriate 2-methyl-Δ²-tetrahydropyrimidine or -imidazoline.

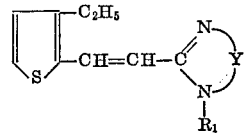

| R₁ | Y |
|---|---|
| H | —CH₂—CH₂— |
| H | —CH₂—CH₂—CH₂— |
| CH₃ | —CH₂—CH₂— |

Example XXXI 1-methyl-2-[2-(3-thienyl)ethyl[-Δ²-tetrahydropyrimidine

Ethyl-β-(3-thienyl)propionimidate hydrochloride [M.P. 114–115° C. (dec.); 3.5 g.; prepared from the nitrile of Procedure G, ethanol and hydrogen chloride by conventional procedure] is added to a solution of N-methyltrimethylenediamine (1.40 g.) in ethanol (25 ml.) at room temperature. The mixture is heated under reflux for 3 hours, and then evaporated to dryness under reduced pressure.

The residue is made alkaline with ice-cold aqueous sodium hydroxide solution, and the product extracted into methylene chloride. The methylene chloride extract is washed with water, dried (Na₂SO₄), filtered, and the solvent evaporated to leave a residue of the desired tetrahydropyrimidine base (2.4 g.) in crude form. This is dissolved in methanol (15 ml.), and the solution treated with fumaric acid (1.45 g.). The fumarate salt thus formed is recrystallized from methanol; M.P. 165–166° C.

Following generally the above procedure, the following imidazoline and tetrahydropyrimidine compounds can be prepared from the appropriate imidate ester and the alkylene diamine H₂N-Y-NH-R:

| R₁ | R₂-thienyl | X | Y |
|---|---|---|---|
| H | 2-fluoro-3-thienyl | —CH₂CH₂— | Eth |
| CH₃ | 2-methyl-3-thienyl | —CH₂CH₂CH₂— | Eth |
| CH₃ | 2-chloro-3-thienyl | Same as above | Eth |
| H | 3-bromo-2-thienyl | —CH₂CH₂— | Tri |
| H | 3-ethyl-2-thienyl | Same as above | Eth |
| CH₃ | 3-chloro-2-thienyl | do | Tri |
| H | 2-fluoro-3-thienyl | do | Tri |
| CH₃ | 2-fluoro-3-thienyl | do | Tri |
| CH₃ | 2-iodo-3-thienyl | do | Eth |
| H | 3-bromo-2-thienyl | do | Eth |
| CH₃ | do | do | Eth |
| CH₃ | do | do | Tri |
| H | 3-chloro-2-thienyl | do | Tri |
| H | do | do | Eth |
| CH₃ | do | do | Eth |
| CH₃ | 3-ethyl-2-thienyl | do | Eth |
| CH₃ | do | do | Tri |
| H | 3-iodo-2-thienyl | do | Eth |
| H | do | do | Eth |
| CH₃ | do | do | Eth |
| CH₃ | do | do | Tri |
| H | 2-chloro-3-thienyl | do | Eth |
| CH₃ | do | do | Tri |
| CH₃ | do | do | Eth |
| H | 2-bromo-3-thienyl | do | Tri |
| H | do | do | Eth |
| CH₃ | do | do | Tri |
| CH₃ | do | do | Eth |
| H | 3-thienyl | do | Tri |
| H | do | do | Eth |
| H | 2-methyl-3-thienyl | do | Eth |
| CH₃ | do | do | Tri |
| H | 2-ethyl-3-thienyl | do | Eth |
| H | do | do | Tri |
| CH₃ | do | do | Eth |
| CH₃ | do | do | Tri |
| H | 2-methyl-3-thienyl | —CH₂CH₂CH₂— | Eth |
| H | do | Same as above | Tri |
| CH₃ | do | do | Tri |
| H | 3-methyl-2-thienyl | do | Eth |
| H | do | do | Tri |
| CH₃ | do | do | Eth |
| CH₃ | do | do | Tri |
| CH₃ | 3-thienyl | —CH₂CH₂— | Eth |
| CH₃ | 2-methyl-3-thienyl | Same as above | Eth |

EXAMPLE XXXII

Six lambs, naturally infected with gastrointestinal nematodes (Haemonchus, Strongyloides, Nematodirus) are selected at random and divided into three pairs. The first pair (I–A and B) received 2-[2-(2-thienyl)ethyl]-Δ2-imidazoline hydrochloride, 50% aqueous solution, as a drench at 40 mg./kg. body weight. The second pair (II–A and B) received 80 mg./kg. body weight of the 50% aqueous solution (drench), and the third, or control, pair (III–A and B) received only sterile distilled water.

Egg counts are made on the three days preceding the treatment and on the first, fourth and seventh days following treatment. Results are tabulated eblow in Tables III and IV, respectively.

TABLE III

Eggs Per Gram of Feces Prior to Medication

| Animal No. | Day −3 | | | | Day −2 | | | | Day −1 | | | |
|---|---|---|---|---|---|---|---|---|---|---|---|---|
| | N | S | O | Total | N | S | O | Total | N | S | O | Total |
| I-A | 0 | 0 | 420 | 420 | 0 | 0 | 640 | 640 | 0 | 0 | 600 | 600 |
| I-B | 0 | 0 | 900 | 900 | 0 | 0 | 720 | 720 | 0 | 0 | 840 | 840 |
| II-A | 0 | 0 | 1,400 | 1,400 | 0 | 0 | 1,800 | 1,800 | 0 | 0 | 1,740 | 1,740 |
| II-B | 0 | 0 | 2,520 | 2,520 | 0 | 0 | 2,880 | 2,880 | 0 | 0 | 2,640 | 2,640 |
| III-A | 20 | 4,660 | 760 | 5,440 | 0 | 7,360 | 840 | 8,200 | 0 | 3,560 | 780 | 6,240 |
| III-B | 0 | 0 | 2,980 | 2,980 | 0 | 0 | 2,360 | 2,360 | 0 | 0 | 2,520 | 2,520 |

Note.—N=Nematodirus; S=Strongyloides; O=Others, mainly Haemonchus.

TABLE IV

| Animal No. | Day −3 | | | | Day −2 | | | | Day −1 | | | |
|---|---|---|---|---|---|---|---|---|---|---|---|---|
| | N | S | O | Total | N | S | O | Total | N | S | O | Total |
| I-A | 0 | 0 | 200 | 200 | 0 | 0 | 120 | 120 | 0 | 0 | 0 | 0 |
| I-B | 0 | 0 | 400 | 400 | 0 | 0 | 120 | 120 | 20 | 0 | 340 | 360 |
| II-A | 0 | 0 | 120 | 120 | 0 | 0 | 200 | 200 | 0 | 0 | 60 | 60 |
| II-B | 0 | 0 | 1,520 | 1,520 | 0 | 0 | 640 | 640 | 0 | 0 | 400 | 400 |
| III-A | 0 | 8,040 | 640 | 8,680 | 0 | 8,520 | 800 | 9,320 | 0 | 7,080 | 80 | 7,880 |

Note.—N=Nematodirus; S=Strongyloides; O=Others, mainly Haemonchus.

From these data it is seen that 2-[2-(2-thienyl)ethyl]-$\Delta^2$-imidazoline hydrochloride is highly effective in reducing the egg counts of Haemonchus and related species.

Similar significant reduction in egg counts can be obtained by administering this agent to cattle, dogs and goats.

EXAMPLE XXXIII

Repetition of the preceding experiment with four other randomly selected, naturally infected lambs, but using 2-[2-(2-thienyl)ethyl]-$\Delta^2$-tetrahydropyrimidine hydrochloride as the annthelmintic agent as a 50% drench solution at 40 mg./kg. and 80 mg./kg. body weight produces the following results. The control lambs of the preceding experiment serve as controls here.

TABLE V

| Animal No. | Day −3 | | | | Day −2 | | | | Day −1 | | | |
|---|---|---|---|---|---|---|---|---|---|---|---|---|
| | N | S | O | Total | N | S | O | Total | N | S | O | Total |
| IV-A | 40 | 300 | 240 | 580 | 80 | 240 | 320 | 640 | 120 | 240 | 360 | 720 |
| IV-B | 20 | 1,160 | 5,180 | 6,360 | 40 | 160 | 4,120 | 4,320 | 80 | 120 | 5,220 | 6,420 |
| V-A | 20 | 380 | 4,660 | 5,060 | 40 | 480 | 6,040 | 6,560 | 80 | 400 | 4,700 | 5,180 |
| V-B | 0 | 40 | 240 | 280 | 40 | 80 | 320 | 440 | 40 | 120 | 360 | 520 |
| III-A | 20 | 4,660 | 760 | 5,440 | 0 | 7,360 | 840 | 8,200 | 0 | 5,560 | 680 | 6,240 |
| III-B | 0 | 0 | 2,980 | 2,980 | 0 | 0 | 2,360 | 2,360 | 0 | 0 | 2,520 | 2,5200 |

TABLE VI

| Animal No. | Drug, mg./kg. | Day +1 | | | | Day +4 | | | | Day +7 | | | |
|---|---|---|---|---|---|---|---|---|---|---|---|---|---|
| | | N | S | O | Total | N | S | O | Total | N | S | O | Total |
| IV-A | 40 | 40 | 80 | 200 | 320 | 0 | 40 | 240 | 280 | 0 | 60 | 260 | 320 |
| IV-B | 0 | 0 | 160 | 1,520 | 1,680 | 40 | 160 | 1,480 | 1,680 | 0 | 260 | 1,020 | 1,280 |
| V-A | 80 | 80 | 200 | 1,100 | 1,380 | 80 | 160 | 1,000 | 1,240 | 0 | 0 | 20 | 20 |
| V-B | 80 | 0 | 0 | 80 | 80 | 0 | 0 | 80 | 80 | 0 | 0 | 0 | 0 |
| III-A | 0 | 0 | 8,040 | 640 | 8,640 | 0 | 8,520 | 800 | 9,320 | 0 | 7,080 | 800 | 7,880 |
| III-B | 0 | 0 | 0 | 1,880 | 1,880 | 0 | 0 | 2,120 | 2,120 | 40 | 0 | 2,400 | 2,440 |

Note.—N=Nematodirus; S=Strongyloides; O=Others, mainly Haemonchus.

Significant reduction in the egg counts are evident particularly at the level of 80 mg./kg. body weight.

EXAMPLE XXXIV

Oral administration of 2-[2-(2-thienyl)ethyl)-$\Delta$-imidazoline (I) or of 2-[2-(2-thienyl)ethyl]-$\Delta^2$-tetrahydropyrimidine (II) as their hydrochloride salts to mice bearing laboratory-induced infections of Nematosplroides dubius or of Nippostrongylus muris (100 larvae per mouse and 500 larvae per mouse, respectively) at three successive daily doses of 100 mg./kg. body weight produces impressive reductions in the parasite burden.

| | N. dubius | N. muris |
|---|---|---|
| Compound: | | |
| I | 97% reduction | 6?% reduction |
| II | 90% reduction | 91% reduction |

EXAMPLE XXXV

Eighteen sheet naturally infected with gastrointestinal nenatodes (Haemonchus, Strongyloides, Trichostrongyles, Nematodirus) are selected at random and divided into six equal groups. One group serves as control and is administered no medication but only sterile distilled water. Four of the remaining five groups are administered 1-methyl-2-[2-(2-thienyl)ethyl]-$\Delta$-tetrahydropyrimidine (A), dissolved in 0.1 M tartaric acid in a 5% concentration, at levels equivalent to 12.5, 25, 50 and 100 mg./kg. of body weight, as a drench. The fifth group is drenched with 2-[2-(2-thienyl)ethyl]-$\Delta^2$-tetrahydropyrimidine (A), dissolved in 0.1 M tartaric acid in a 5% concentration, at a level equivalent to 50 mg. of free base per kg of body weight.

The average reductions in the total egg count in each group are tabulated below.

| Compound | Dosage (mg./kg.) | Average reduction in egg count, percent |
|---|---|---|
| A | 12.5 | 92.30 |
| | 25 | 98.96 |
| | 50 | 100.00 |
| | 100 | 100.00 |
| Control | 50 | 98.91 |

EXAMPLE XXXVI

Repetition of the procedure of Example XXXV but using 1-methyl-2-[2-(2-thienyl)ethyl]-$\Delta$-imidazoline in place of 1-methyl-2-[2-(2-thienyl)ethyl]-$\Delta^2$-tetrahydropyrimidine at levels equivalent to 6.25, 12.5, 25 and 50 mg./kg. of body weight produces the following significant reductions in the nematode egg counts.

| Dosage (mg./kg.) | Average reduction in egg count, percent |
|---|---|
| 6.25 | 96.46 |
| 12.5 | 98.65 |
| 25 | 99.91 |
| 50 | 100.00 |

A single dose, 100 mg./kg. body weight, of the resin adsorbate of 2-[2-(2-thienyl)ethyl]-$\Delta^2$-tetrahydropyrimidine (the product of Example IX reduced the *N. dubius* and *N. muris* infections of mice by 85% and 60%, respectively.

EXAMPLE XXXVII

Tablets and boluses

A convenient tablet size is one containing 250 mg. of the drug. Such tablets can be prepared by thoroughly blending 250 g. of 2-[2-(2-thienyl)ethyl]-$\Delta^2$imidazoline or the equivalent weight of other compound within the scope of this invention and 50 g. of starch in a twin shell blender. The blended powders are then mixed with sufficient ethanol to make an easily manipulated paste which is extruded through a 10-mesh screen to provide granules which are dried in vacuo until all the solvent is removed. The granules are coated with magnesium stearate by briefly blending with 2% the total weight of granules of that substance. This mixture is then fed to a tableting press to produce tablets containing 250 mg. of anthelmintic agent in addition to proportionate quantities of the carriers and excipients listed above. For animals, the daily dose varies from ½ to 45 g. per day depending again upon the body weight of the animal. Boluses of various sizes can be prepared in the same fashion by simply selecting a die of appropriate size.

EXAMPLE XXXVIII

Capsules

The products of this invention and their acid addition salts can be conveniently encapsulated in hard gelatin capsules. For therapeutic and prophylactic purposes, from about 250 mg. to 1 gram of these agents can be contained in a single capsule. It is convenient to mix the active ingredient with a solid diluent, for instance, calcium phosphate. From about 15 to 50% the weight of drug of tricalcium phosphate is employed. Thus, a hard gelatin capsule can be prepared by thoroughly blending two parts by weight of 2-[2-(2-thienyl)ethyl]-$\Delta^2$-imidazoline phosphate with one part by weight of calcium phosphate in a twin shell blender. The powder is then subdivided, and loaded into hard gelatin capsules in such a fashion that each capsule contains 250 mg. active ingredient.

EXAMPLE XXXIX

Mineral mixture

Such a mixture can be conveniently made by mixing 2-[2-(2-thienyl)ethyl] - $\Delta^2$ - imidazoline hydrochloride, equivalent to 1 part by weight of free base, with 19 parts by weight of the usual granular stock of salt (sodium chloride). The mixture is thoroughly blended and fed to the animals in such quantities as to provide the recommended daily dose. Such salt mixtures can also be incorporated into block form but this is not preferred due to lack of control of the dosage size received by the animal.

In like manner mineral mixtures of the other products within the ambit of this invention can be prepared.

EXAMPLE XL

Feed mixture

Prophylactic use of these products can be properly accomplished by adding the agent to a feed mixture. The usual prophylactic dose is from 2.5 to 25 g. (calculated as free base) daily for 1000 pound cattle. Assuming such animal consumes 10 lbs. of feed supplement per day, 10 pounds of the chosen agent per ton would be incorporated. Depending upon the feed consumption of the animal and the dosage employed, the proportion of agent in the feed varies from .05% up to about 10% on a weight basis.

EXAMPLE XLI

Lambs naturally infected with gastrointestinal helminths can be cleared to a significant degree by the subcutaneous administration of 2-[2-(2-thienyl)ethyl]-$\Delta^2$-imidazoline hydrochloride at levels of from about 20 mg./kg. to about 150 mg./kg. The local edema which frequently accompanies the injection can be prevented or at least minimized by the simultaneous administration of about 150 units (U.S.P.) of hyaluronidase.

Similarly, the other products of this invention can be used for the control of helminthic infection.

EXAMPLE XLII

The anthelmintic activity of 1-methyl-2-[2-(2-thienyl)ethyl]-$\Delta^2$-imidazoline and 1 - methyl - 2 - [2 - (2 - thienyl) ethyl]-$\Delta^2$-tetrahydropyrimidine and their amsonate and p-toluene sulphonate salts (p-tosylates) is assessed using laboratory mice infested with *Nematospiroides dubius* and laboratory rats infested with *Nippostrongylus muris*. Results are summarized in Table VII.

TABLE VII

| Compound | Helminth | Host | Dose (given orally) | Percent removal of Worms |
|---|---|---|---|---|
| Imidazoline base | *N. dubius* | Mouse | 1×50 mg./kg. | 78 |
| Do | *N. muris* | Rat | 3×100 mg./kg. | 88 |
| Imidazoline p-tosylate | *N. dubius* | Mouse | 1×25 mg./kg. | 83 |
| Do | do | do | 1×50 mg./kg. | 90 |
| Do | *N. muris* | Rat | 1×50 mg./kg. | 88 |
| Tetrahydropyrimidine base | *N. dubius* | Mouse | 3×100 mg./kg. | 98 |
| Do | *N. muris* | Rat | 3×100 mg./kg. | 100 |
| Tetrahydropyrimidine p-tosylate | *N. dubius* | Mouse | 1×25 mg./kg. | 74 |
| Do | do | do | 1×50 mg./kg. | 86 |
| Do | *N. muris* | Rat | 1×50 mg./kg. | 77 |
| Tetrahydropyrimidine amsonate | *N. dubius* | Mouse | 2×300 mg./kg. | 96 |
| Do | *N. muris* | Rat | 1×150 mg./kg. | 99 |

2-[2-(2-thienyl)ethyl] - $\Delta^2$ - tetrahydropyrimidine amsonate and suramin salts are active against *N. dubius* and *N. muris* as the following data shows.

| Compound | Helminth | Host | Dose (given orally) | Percent removal of worms |
|---|---|---|---|---|
| Amsonate | *N. dubius* | Mouse | 3×500 mg./kg. | 99 |
| Do | *N. muris* | Rat | 3×250 mg./kg. | 64 |
| Suramin salt | *N. dubius* | Mouse | 3×250 mg./kg. | 99 |
| Do | *N. muris* | Rat | 3×250 mg./kg. | 80 |

EXAMPLE XLIII

Repetition of the procedure of Example XLII but using 1-methyl-2-[2-(3-methyl-2-thienyl)vinyl]-$\Delta^2$ - tetrahydropyrimidine hydrochloride as the drug gives the following results demonstrative of the efficacy of this drug as an anthelmintic.

| Helminth | Dose | Percent removal of worms |
|---|---|---|
| N. dubius | 1×250 mg./kg. | 100 |
| Do | 1×125 mg./kg. | 100 |
| Do | 1×62.5 mg./kg. | 100 |
| Do | 1×31.25 mg./kg. | 100 |
| Do | 1×7.8 mg./kg. | 100 |
| Do | 1×3.5 mg./kg. | 100 |
| Do | 1×1.25 mg./kg. | 93 |

EXAMPLE XLIV

The effect of 1-methyl-2-[2-(2-thienyl)ethyl]-Δ²-tetrahydropyrimidine tartrate against the migratory phases of *Ascaris suum* in pigs is determined as follows.

Nine four-week-old pigs are divided into three groups of three and treated in the following manner.

Group 1—Non-infected, non-medicated
Group 2—Infected, non-medicated
Group 3—Infected, medicated The above drug is administered in the basal ration of Group 3 at a level of 50 g. of drug per ton of ration beginning two days before infection. The pigs are artifically infected on the third and fourth days by providing them with 100,000 embryonated ova (per pig) in wet feed each day. The Group 2 pigs are infected in like manner. The Group 3 pigs receive the medicated feed ad libitum as during the pre-infection period for a total of ten days treatment.

All animals are sacrificed seven days after the infection and the livers and lungs inspected for characteristic lesions and the number of larvae present.

The drug is thus found to be highly effective in protecting pigs against *Ascaris suum* infection. The infected, non-medicated animals developed thumping, coughing, anorexia and prostration and their livers and lungs were covered with innumerable mottling lesions and petechial hemorrhages. The infected, medicated animals showed no abnormal signs during the experiment. Their livers showed some lesions. However, similar mottling lesions appeared in the non-infected, non-medicated animals indicating they contained some natural *Ascaris suum* infection.

Additionally, reduction in the number of larvae in the lungs of up to 98% is observed. This is determined by removing a 10 g. sample from both lungs, digesting the samples in acidified pepsin at 37° C. overnight and examining the fluid thus produced for the presence of larvae with the aid of a binocular microscope.

EXAMPLE XLV

The MED (minimum effective dose), the dose which achieves at least a 90% reduction in the worm burden of mice bearing laboratory induced infections of *N. dubius* is determined for the following compounds. The drugs are dissolved or suspended in a 1% carboxymethylcellulose solution at such a concentration that 0.4 ml. delivered an appropriate dose to a 20 g. mouse. The treated mice were dosed orally for one to three days. A high dose is used initially (100–2000 mg./kg. depending on the compound's toxicity) and successively lower doses used until at least a 90% reduction is achieved.

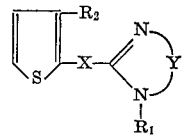

| $R_1$ | $R_2$ | X | Y | Salt | MED (mg./kg.) | Days given |
|---|---|---|---|---|---|---|
| H | H | —CH₂CH₂— | Eth | Base | 100 | 3 |
| H | H | —CH₂CH₂— | Eth | HCl | 100 | 3 |
| H | H | —CH₂CH₂— | Tri | Base | 100 | 3 |
| H | H | —CH₂CH₂— | Tri | HCl | 100 | 3 |
| CH₃ | H | —CH₂CH₂— | Eth | Base | 25 | 1 |
| CH₃ | H | —CH₂CH₂— | Eth | Tartrate | 50 | 1 |
| CH₃ | H | —CH₂CH₂— | Tri | Base | 25 | 1 |
| CH₃ | H | —CH₂CH₂— | Tri | Tartrate | 50 | 1 |
| H | CH₃ | —CH₂CH₂— | Eth | Base | | |
| H | CH₃ | —CH₂CH₂— | Eth | HCl | 125 | 1 |
| CH₃ | CH₃ | —CH₂CH₂— | Eth | HCl | 30 | 1 |
| CH₃ | CH₃ | —CH₂CH₂— | Tri | HPF₆ | 62.5 | 1 |
| CH₃ | H | —CH=CH— | Eth | Tosylate | 50 | 1 |
| CH₃ | CH₃ | —CH=CH— | Eth | HCl | 25 | 1 |
| H | H | —CH=CH— | Tri | Maleate | 50 | 1 |
| CH₃ | H | —CH=CH— | Tri | Tartrate | 12.5 | 1 |
| H | CH₃ | —CH=CH— | Tri | HCl | >125 | 1 |
| CH₃ | CH₃ | —CH=CH— | Tri | HCl | 3.1 | 1 |
| CH₃ | C₂H₅ | —CH=CH— | Tri | Fumarate | 25 | 1 |
| CH₃ | Br | —CH=CH— | Tri | Tartrate | 25 | 1 |

Preparation A.—3-(2-thienyl)acrylonitrile

A solution of 123.4 g. (1.10 moles) of 2-thiophenecarboxaldehyde, 85.0 g. (1.00 mole) cyanoacetic acid, 3 g. of ammonium acetate, 110 ml. of pyridine, and 200 ml. of toluene is heated under reflux in an apparatus which includes a Dean-Stark moisture trap. Heating is continued for 48 hours during which time the solution becomes very dark. After the heating period is over the solution is allowed to cool and the solvents then evaporated under reduced pressure. The less volatile residue is fractionally distilled through a column packed with Berl saddles to yield the product which is initially a colorless oil: B.P. 154° C. at 30 mm.; yield, 107.4 g. (79%); $n_D^{25}$ 1.6373.

In like manner, 3-(3-methyl-2-thienyl)acrylonitrile is prepared from 3-methyl-thiophene-2-carboxaldehyde. The product is an oil; B.P. 76° C. at 0.1 to 0.05 mm.; $n_D^{25}$ 1.6330.

Preparation B.—3-(2-thienyl)propionitrile

A pressure bottle is charged with 67.6 g. (0.5 mole) of 3-(2-thienyl)acrylonitrile, 50 cc. of 1 N sodium hydroxide, 300 cc. of methanol, and 10 g. of 5% palladium-on-carbon catalyst. The pressure bottle is swept free of air by nitrogen and then fitted onto a Parr hydrogenation apparatus. Hydrogenation is conducted in the normal manner until the theoretical amount (0.5 mole) of hydrogen is absorbed. The catalyst is removed by filtration, and the filtrate concentrated to a mixture of an oil and aqueous sodium hydroxide. Water is added to this mixture and the organic material extracted with ether. The ether extract is dried, filtered and evaporated under reduced pressure to give a pale yellow oil which is fractionally distilled through a column packed with Berl saddles to give 3-(2-thienyl)propionitrile as a colorless oil: B.P. 156–158° C. and 35 mm.; yield, 49.5 g. (72%) $n_D^{25}$ 1.5372.

Hydrogenation of 3-(3-methyl-2-thienyl)acrylonitrile in like manner produces 3-(3-methyl-2-thienyl)propionitrile; B.P. 66° C. at 0.1–0.08 mm.

Preparation C.—Ethyl 3-(2-thienyl)propionimidate hydrochloride

A solution of 162.4 g. (1.18 moles) of 3-(2-thienyl) propionitrile in 60.0 g. (1.3 moles) dry ethanol and 360 ml. of dry ether is saturated with hydrogen chloride while the temperature is maintained at below 10° C. After three hours the yellow orange solution is saturated and then stirred at ambient temperature overnight under a dry nitrogen atmosphere. Sufficient ether is lost during this time to produce a solid cake in the reaction flask, which is broken up by the addition of fresh ether. The product is collected, washed thoroughly with ether and dried at room temperature for three hours, to give 224 g. (86% yield) of product melting at 122°–124° C. The product is stored under nitrogen in the refrigerator.

Repetition of this procedure but replacing ethanol by methanol, n-propanol or n-butanol produces the corresponding alkyl-3-(2-thienyl)propionimidate hydrochloride.

Application of procedures A, B and C above to the appropriate thiophene carboxaldehydes affords the following methyl 3-(thienyl)propionimidates as their hydrochlorides:

3-(3-bromo-2-thienyl)-
3-(3-ethyl-2-thienyl)-
3-(3-chloro-2-thienyl)-
3-(3-iodo-2-thienyl)-
3-(2-chloro-3-thienyl)-
3-(2-bromo-3-thienyl)-
3-(2-methyl-3-thienyl-)-
3-(2-ethyl-3-thienyl)-

Preparation D.—3-bromo-2-thiophencarboxaldehyde

A Grignard reagent is prepared by heating under reflux for 72 hours a mixture of 2,3-dibromothiophene (76 g.), ethyl bromide (22 g.), magnesium (13.2 g.), dry ether (800 ml.) and a few crystals of iodine.

The mixture is then poured into a stirred solution of dimethylformamide (52 g.) in ether (200 ml.) cooled in ice. The resulting mixture, which contains a pale yellow solid in suspension, is heated under reflux for 2 hours.

Dilute hydrochloric acid is then added with stirring and the ether phase separated. The aqueous phase is extracted with ether, and the combined ether phases washed with water, dried (MgSO$_4$) and heated to distill off ether. The residue is distilled under reduced pressure to give 42 g. of product; B.P. 121–123° C. at 19 mm., $n_D^{21}$=1.6355.

Preparation E.—3-ethyl-2-thiophenecarboxaldehyde

Phosphorus oxychloride (20 g.) is added over 30 minutes to a stirred mixture of 3-ethylthiophene (11.2 g., Procedure H) and dimethylformamide (8.4 g.) heated on a steam bath. Heating is continued for a further hour, and the mixture then cooled and poured into ice-water (150 ml.). After addition of sodium acetate to raise the pH to 5, the mixture is extracted with ether, and the ether extract washed with water, dried (MgSO$_4$) and heated to distill off ether. The residue is fractionally distilled, and the fraction of B.P. 114–116° C. at 17 mm. collected.

Examination of this fraction by gas-liquid chromatography, and a consideration of its infra-red absorption and neutron magnetic resonance properties, showed it to be a mixture of the desired 3-ethyl compound with its 4-ethyl isomer in the proportions 5:2.

Preparation F.—3-(3-thienyl)acrylonitrile 3-thiophenecarboxaldehyde (24.89 g.), cyanoacetic acid (21.20 g.), ammonium acetate (0.80 g.), pyridine (27.5 ml.) and dry xylene (80 ml.) are heated under reflux for 17 hours in an apparatus fitted with a moisture trap. The volatile ingredients of the mixture are distilled off under reduced pressure, and the residue fractionally distilled to obtain the product as an oil; B.P. 102–108° C. at 1.5 mm. Examination of the product by gas-liquid chromatography shows it to be a mixture of cis and trans isomers.

Preparation G.—3-(3-thienyl)propionitrile 3-(3-thienyl)acrylonitrile (16.0 g., Preparation F), methanol (300 ml.) and 10% palladium-on-carbon catalyst (2.9 g.) are mixed, and the mixture treated with hydrogen under pressure and at room temperature for six hours. The catalyst is removed by filtration, and the methanol distilled off in vacuo from the filtrate. The residue is dissolved in methylene chloride, and the solution dried (Na$_2$SO$_4$), filtered and evaporated under reduced pressure. Fractional distillation of the residue gives pure 3-(3-thienyl)propionitrile, B.P. 136–138° C. at 14 mm.

Preparation H.—3-ethylthiophene

Dry disodium ethylsuccinate (42 g.; from sodium methoxide and ethylsuccinic acid) is mixed with phosphorus heptasulphide (P$_4$S$_7$; 45 g.) and a mineral oil diluent (75 ml.) of high boiling point. The mixture is added over 2 hours to mineral oil (50 ml.) heated to 250–300° C. under an atmosphere of carbon dioxide.

The material that distills off is fractionally redistilled, and the fraction of B.P. 143–5° C. collected.

Preparation I.—4-(3-thienyl)butyronitrile

Following the procedure of Fieser, et al., J. Am. Chem. Soc. 57, 1611 (1935), 3,5-dichlorothiophene is reacted with succinic anhydride in the presence of aluminum chloride in benzene to give 3-(2,5-dichloro-3-thenoyl) propionic acid. Clemmensen reduction of the product affords 4-(2,5-dichloro-3-thienyl)butyric acid. Removal of the chloro groups by the procedure of Gronowitz, Arkiv. Kemi. 8, 441 (1955) gives 4-(3-thienyl)butyric acid. The nitrile is obtained by dehydration of 4-(3-thienyl)butyramide according to the procedure described in Example VI for the corresponding 2-isomer.

What is claimed is:

1. A method for the control of helminthiasis in animals which comprises orally or parenterally administering to said animals an anthelmintically effective amount of a compound selected from the group consisting of

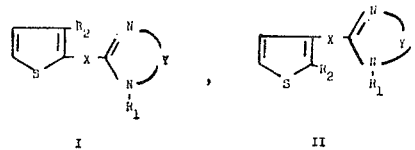

and the non-toxic acid-addition salts thereof wherein R$_1$ is selected from the group consisting of hydrogen and methyl; R$_2$ is selected from the group consisting of hydrogen, methyl, ethyl, chloro, bromo, iodo and fluoro; X is selected from the group consisting of ethylene, trimethylene and vinylene; and Y is selected from the group consisting of ethylene and trimethylene; with the proviso that when X is trimethylene, R$_2$ is selected from the group consisting of hydrogen and methyl.

2. The method of claim 1 wherein the compound is of Formula I wherein R$_1$ is methyl, R$_2$ is hydrogen, X is vinylene, Y is trimethylene and the non-toxic acid-addition salts thereof.

3. The method of claim 1 wherein the compound is of Formula I wherein R$_1$ and R$_2$ are methyl, X is vinylene, Y is trimethylene, and the non-toxic acid-addition salts thereof.

4. The method of claim 2 wherein the non-toxic acid-addition salt is the tartrate.

5. The method of claim 2 wherein the non-toxic acid-addition salt is the pamoate.

6. The method of claim 3 wherein the non-toxic acid-addition salts is the tartrate.

7. The method of claim 3 wherein the non-toxic acid-addition salt is the hydrochloride.

References Cited

UNITED STATES PATENTS 3,001,909   9/1961   Sarett et al. _____ 424—251
3,088,867   5/1963   Rogers et al. _____ 424—251

JEROME D. GOLDBERG, Primary Examiner

F. E. WADDELL, Assistant Examiner

U.S. Cl. X.R.

424—273, 275

UNITED STATES PATENT OFFICE
CERTIFICATE OF CORRECTION

Patent No. U. S. 3,644,624     Dated February 22, 1972

Inventor(s) Lloyd H. Conover, James W. McFarland, William C. Austin

It is certified that error appears in the above-identified patent and that said Letters Patent are hereby corrected as shown below:

column 18, line 74, change "eblow" to -- below --.
column 19, line 2 from bottom of Table III under heading "Day -1", sub-heading "0", change "780" to -- 680 --.
column 19, last line of Table V under heading "Day -1," sub-heading "Total," change "2,5200" to -- 2,520 --.
column 19, line 61, change "$\Delta$" to -- $\Delta^2$ --.
column 20, line 25, change "sheet" to -- sheep --.
column 20, line 26, change "nenatode" to -- nematode --.
column 20, lines 31, change "$\Delta$" to -- $\Delta^2$ --.
column 20, line 73, change "$\Delta$" to -- $\Delta^2$ --.

Signed and sealed this 11th day of July 1972.

(SEAL)
Attest:

EDWARD M. FLETCHER, JR.
Attesting Officer

ROBERT GOTTSCHALK
Commissioner of Patents